May 8, 1923.                    M. B. ERICSON                    1,454,270
                              AUTOMOBILE BUMPER
                             Filed June 29, 1921
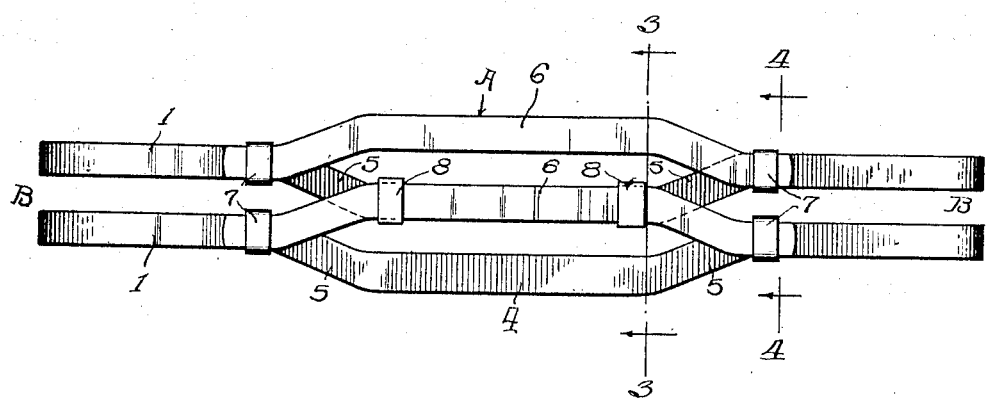
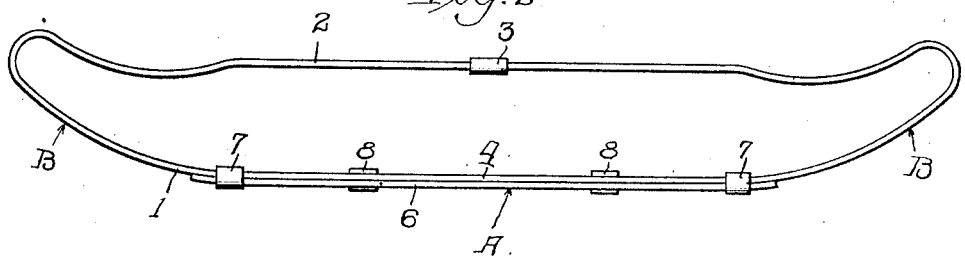
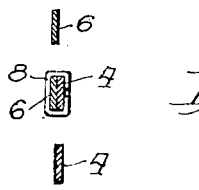 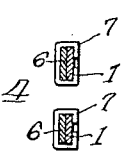
Inventor
Melvin B. Ericson,
By Offield, Poole & Huston, Attys.

Patented May 8, 1923.

1,454,270

UNITED STATES PATENT OFFICE.

MELVIN B. ERICSON, OF EVANSTON, ILLINOIS, ASSIGNOR, BY MESNE ASSIGNMENTS, TO BIFLEX PRODUCTS COMPANY, A CORPORATION OF DELAWARE.

AUTOMOBILE BUMPER.

Application filed June 29, 1921. Serial No. 481,194.

*To all whom it may concern:*

Be it known that I, MELVIN B. ERICSON, a citizen of the United States, and a resident of Evanston, in the county of Cook and State of Illinois, have invented certain new and useful Improvements in Automobile Bumpers, of which the following is a specification.

This invention relates to improvements in automobile bumpers, and more particularly to bumpers of the so-called resilient bar type having an impact area of increased width throughout the central portion of the impact member. As a matter of fact, the present invention pertains to an adaptation of the type of bumper fully illustrated and described in the Pancoast and Grotenhuis Patent No. 1,374,893.

As will presently be pointed out, the preferred form of bumper herein disclosed consists of two units or single bumpers, positioned one above the other and joined together in such a manner as to provide two vertically spaced bars throughout the end portions of the impact member, and three vertically spaced bars throughout the central or intermediate portion thereof.

Such a bumper as above described is disclosed in the accompanying drawings, in which:

Fig. 1 is a view in front elevation of the bumper,

Fig. 2 is a top plan view of the bumper,

Fig. 3 is a vertical section through the impact member as taken on line 3—3 of Fig. 1, and Fig. 4 is a similar view taken on line 4—4 of Fig. 1.

As already suggested, the bumper structure is made up of bars of resilient metal formed so that their faces lie in a vertical plane, and thus relatively yieldable in a horizontal direction, and relatively non-yieldable in a vertical direction.

Considering the parts of the bumper in general, the same comprises an impact member, forming that part of the bumper which is exposed to impact with objects coming into contact with the bumper, said impact member consisting of a central impact section A of increased vertical width, and end sections B, somewhat less in vertical width than the central impact section.

The bumper is primarily made up of two identical units, each comprising continuous bars 1—1, extending throughout their entire length, and having their ends bent rearwardly and inwardly, forming rear portions 2—2 which are joined together with their ends in abutting relation by clamps 3. Intermediate the ends of the bars and throughout the central impact section A, the same are provided with parallel and vertically offset portions 4—4 and intermediate inclined portions 5—5. As clearly shown in Fig. 1, the offset portions 4—4 are displaced in the same direction; namely, downwardly from the end portions of the bars 1—1. Connected with each of the bars 1—1, and also extending throughout the central impact area thereof, are short auxiliary bars 6—6 having the same contour as the offset and inclined portions 4—4 and 5—5, but extending in the opposite direction therefrom; thus each of the bars 1—1 with their associated bars 6—6 form a complete bumper unit having a central impact area substantially twice the width of each bar. These short bars 6—6 have flatwise and overlapping contact at their ends with the bars 1—1, and are securely clamped thereto by means of clamping collars 7.

These two independent structures or units are united together by clamping together the downwardly offset portion 4 of the uppermost unit with the upwardly disposed auxiliary bar 6 of the lower unit, these portions being brought into overlapping and flatwise contact along their faces and clamped together by means of clamping collars 8—8, located adjacent the ends of the horizontal portions thereof.

As thus constructed and united, the two single bumper structures form what may be termed a double bumper, having substantially twice the shock resisting capacity, and substantially twice the protective or impact area, not only throughout the central portion of the bumper, but likewise throughout the end sections B, B. By the overlapping arrangement of the bars forming the central impact area A, the thickness of the bumper is no greater at any point than the combined thickness of two of the bars, it being observed that the offset portions 4—4 lie in the same plane, and that the auxiliary bars 6—6 lie in a parallel plane, removed but a short distance forwardly, so that the overlapping of the main bar 1 of one unit with an auxiliary bar 6 of the other unit brings the corresponding parts of both units into vertical alignment, as is clearly shown in Fig. 2.

While one of the single bumper structures would afford ample protection for a passenger vehicle, it is manifest that it would not afford the same degree of protection for heavier vehicles such as motor trucks or motorized fire apparatus. By uniting two such structures or units in the simple yet novel manner described, it becomes possible to produce bumpers of twice the strength and twice the protective area, without the additional expense and labor of designing and making of especially designed bumpers to fulfill the requirements of heavy vehicles. Hence, by joining two units together and providing a suitable attaching bracket, a protective device of adequate strength is provided with all the advantages of resiliency, but with the additional advantages of increased strength and impact area.

It is manifest that more than two units may be united in the same manner, it being merely a matter of building up or adding to until a structure of the desired size is produced. It is for this reason that I do not wish the invention or its application to be limited to the specific disclosure.

Having described the structure embodying the invention and the advantages thereof, I claim as new and novel:

1. An automobile bumper having an impact member comprising parallel bars spaced apart vertically at its ends and vertically offset bars intermediate its ends extending toward each other and meeting in overlapping engagement.

2. An automobile bumper having an impact member comprising parallel bars spaced apart vertically throughout the end portions of said impact member and intermediate offset bars, fastened together in overlapping engagement.

3. An automobile bumper having an impact member comprising parallel bars spaced apart vertically throughout their end portions and each bar having a central impact section comprising vertically offset bars the adjacent offset bars meeting in overlapping engagement, and means for securing said overlapping bars together.

4. An automobile bumper having an impact member comprising parallel bars spaced apart vertically and each bar having a vertically offset portion intermediate its ends, and an auxiliary offset portion forming with said offset portion, a central impact section of increased width, the adjacent offset portions of each bar being secured together in flatwise overlapping contact.

5. An automobile bumper having an impact member comprising parallel bars spaced apart vertically and provided with transverse offset portions intermediate their ends, and relatively short bars secured at their ends to said parallel bars, and provided with offset portions corresponding to the offset portions of said parallel bars, and oppositely disposed therefrom, the adjacent offset portion and short bar being clamped together in overlapping engagement.

6. An automobile bumper having an impact member comprising parallel bars spaced vertically throughout the ends thereof, each of said bars having offset portions extending in opposite direction and forming a central impact area of increased width, the adjacent offset portions of said bars being secured together in overlapping engagement with each other.

7. An automobile bumper comprising resilient bars spaced apart, one above the other, each bar having oppositely offset portions intermediate its ends, an offset portion of one bar having overlapping engagement with an offset portion of the other bar, and clamps connecting said offset portions together.

In witness whereof, I hereunto subscribe my name this 24th day of June, A. D., 1921.

MELVIN B. ERICSON.